(12) United States Patent
Zheng et al.

(10) Patent No.: US 10,423,315 B2
(45) Date of Patent: Sep. 24, 2019

(54) INSTANT MESSAGING METHOD, CLIENT, AND SYSTEM BASED ON GRAPH GRID

(71) Applicant: CIENET TECHNOLOGIES (BEIJING) CO., LTD., Beijing (CN)

(72) Inventors: Liang Zheng, Beijing (CN); Xibin Liu, Beijing (CN)

(73) Assignee: CIENET TECHNOLOGIES (BEIJING) CO., LTD., Beijing (CN)

( * ) Notice: Subject to any disclaimer, the term of this patent is extended or adjusted under 35 U.S.C. 154(b) by 211 days.

(21) Appl. No.: 15/515,601

(22) PCT Filed: Sep. 30, 2015

(86) PCT No.: PCT/CN2015/091325
§ 371 (c)(1),
(2) Date: Mar. 30, 2017

(87) PCT Pub. No.: WO2016/050223
PCT Pub. Date: Apr. 7, 2016

(65) Prior Publication Data
US 2018/0348996 A1 Dec. 6, 2018

(30) Foreign Application Priority Data
Sep. 30, 2014 (CN) .......................... 2014 1 0523278

(51) Int. Cl.
*G06F 3/0484* (2013.01)
*H04L 12/58* (2006.01)
(Continued)

(52) U.S. Cl.
CPC ........ *G06F 3/04845* (2013.01); *G06F 3/0482* (2013.01); *G06F 3/04817* (2013.01); *H04L 51/00* (2013.01); *H04L 51/04* (2013.01)

(58) Field of Classification Search
CPC . G06F 3/0482; G06F 3/04817; G06F 3/04845
See application file for complete search history.

(56) References Cited

U.S. PATENT DOCUMENTS 8,799,756 B2 * 8/2014 Grosz .................. G06F 3/1242
715/202
2013/0124978 A1 * 5/2013 Horns .................. G06F 17/241
715/243
(Continued)

FOREIGN PATENT DOCUMENTS

CN 102314441 1/2012
CN 102567509 7/2012

*Primary Examiner* — David E Choi
(74) *Attorney, Agent, or Firm* — JMB Davis Ben-David

(57) ABSTRACT

The invention provides a method for a user to input individualized primitive data and equipment and a system. The method comprises the following steps of: detecting an input sequence on user equipment; performing match search on the input sequence to acquire one or more matched local individualized primitive data options; and selecting the matched local individualized primitive data options as candidate options, and displaying the candidate options to the user to select. By the method, the equipment and the system, the defect that only character input and symbol input are supported by a traditional input method is overcome; the input of multiple types of individualized primitive data including pictures, audios/videos, style template user-defined characters and the like is realized by the input method; and the user experience is enhanced.

15 Claims, 3 Drawing Sheets

(51) Int. Cl.
  *G06F 3/0481* (2013.01)
  *G06F 3/0482* (2013.01)

(56) References Cited

U.S. PATENT DOCUMENTS

| | | | | |
|---|---|---|---|---|
| 2014/0123059 A1* | 5/2014 | Sandler | ............... | G06F 3/04817 |
| | | | | 715/790 |
| 2014/0195921 A1* | 7/2014 | Grosz | ................... | G06F 3/1242 |
| | | | | 715/738 |
| 2014/0380189 A1* | 12/2014 | Hata | ..................... | G06F 1/1681 |
| | | | | 715/752 |
| 2015/0058733 A1* | 2/2015 | Novikoff | .............. | G11B 27/031 |
| | | | | 715/723 |
| 2018/0348996 A1* | 12/2018 | Zheng | ..................... | H04L 51/00 |

* cited by examiner

INSTANT MESSAGING METHOD, CLIENT, AND SYSTEM BASED ON GRAPH GRID

CROSS-REFERENCE TO RELATED APPLICATIONS

This is the U.S. National Stage of International Application No. PCT/CN2015/091325, filed on Sep. 30, 2015, which was published in Chinese under PCT Article 21(2), which in turn claims the benefit of Chinese Application No. 201410523278.7, filed on Sep. 30, 2014. The entire disclosures of each of the above applications are incorporated herein by reference.

BACKGROUND

Technical Field

The present invention relates to the field of instant messaging technologies, and relates to an instant messaging method, in particular, to an instant messaging method based on a graph grid, simultaneously to an instant messaging client configured to implement the method, and also to an instant messaging system including the instant messaging client.

Related Art

Instant messaging (IM in short) is an Internet-based instant information communication service. With the rapid development of the mobile Internet, the instant messaging has become a necessary online communication platform for people. For example, QQ and WeChat respectively have billions of users. By using an instant messaging tool, a user not only can perform a text chat, a voice chat, and a video chat with a good friend, but also can perform chat communication by using abundant system icons and custom icons and pictures, so as to greatly improve enjoyment of communication, and enrich experience in communication between the users.

However, text, voice, and video chatting manners that are commonly used by existing instant messaging tools generally place an emphasis only on accurate and effective conveyance of information expressed by users, and are lack of enjoyment in information creation and information interpretation. A communication manner in which expressions or pictures are used fails to reveal ideas and intentions of users in a rich and interesting manner in spite of great increase of enjoyment of communication. Generally, a user can send only one icon or picture each time, and cannot perform combination, editing, or the like on the picture or the like. However, an icon or a picture only can express meaning of a single word, is used to express a mood or status of the user at a moment, but cannot express complete meaning of one sentence to be expressed by the user. Therefore, current instant messaging tools provide no more space for imagination and putting the imagination into action to users. Consequently, a degree of communication between the users is limited to some extent.

SUMMARY

With respect to disadvantages of the prior art, the first technical problem to be resolved by the present invention is to provide an instant messaging method based on a graph grid.

Another technical problem to be resolved by the present invention is to provide an instant messaging client configured to implement the foregoing method.

Still another technical problem to be resolved by using the present invention is to provide an instant messaging system including the foregoing instant messaging client.

To implement the foregoing objectives of the present invention, the present invention uses the following technical solutions.

An instant messaging method based on a graph grid is used to implement sending of graph grid information, and the method includes the following steps:

step 1: determining a selected graph grid according to a contact position of a user on a graph grid input interface;

step 2: loading and displaying repository information selected by the user in the graph grid to generate and store an information instruction; and step 3: repeating the foregoing operations until completing editing the entire graph grid input interface, and sending the information instruction as the graph grid information.

Preferably, step 1 further includes:

determining whether the contact position is in a coordinate area of a particular graph grid of the graph grid input interface according to coordinates of the contact position; and if yes, acquiring a position identifier of the selected graph grid and invoking an information repository; and otherwise, neglecting the operation.

Preferably, step 2 further includes:

retrieving control information according to a position identifier of the selected graph grid;

updating the control information according to the repository information selected by the user; and displaying the repository information on the graph grid input interface according to the control information.

An instant messaging method based on a graph grid is used to implement receiving of graph grid information, and includes the following steps:

extracting and parsing the graph grid information in sequence, and initializing a graph grid control list;

updating control information in the graph grid control list according to the graph grid information; and loading repository information according to the control information and displaying the repository information in the graph grid.

Preferably, the repository information includes icons, where each of the icons is configured with a unique icon number.

Preferably, the icons include planar images, dynamic images, and three-dimensional images.

Preferably, the repository information includes sound identifiers, where each of the sound identifiers is configured with a unique sound identifier number.

Preferably, the control information includes graph grid center point coordinates and an icon number, where the graph grid center point coordinates are a display position of an icon.

Preferably, the control information further includes graph grid lower right point coordinates and a sound identifier number, where the graph grid lower right point coordinates are a display position of a sound identifier.

Preferably, the graph grid information includes a position identifier of the graph grid and an information repository identifier, where the position identifier of the graph grid is used to determine a position of the graph grid on the graph grid input interface, and the information repository identifier is an icon number and/or a sound identifier number.

Preferably, the graph grid information further includes a graph grid style identifier, where the graph grid style identifier is used to determine a style of the graph grid input interface used by a transmit end.

An instant messaging client configured to implement the foregoing instant messaging method includes an information collection module, a graph grid control module, a graph grid editing module, an information storage module, and an information repository, where the information collection module is configured to acquire contact information of a graph grid input interface, and determine a selected graph grid according to the contact information;

the graph grid control module acquires control information of the graph grid according to a position identifier of the selected graph grid, and controls display of an icon and a sound identifier and phonation of the sound identifier according to the control information;

the information repository is configured to store the icon and the sound identifier;

on one hand, the graph grid editing module updates the control information according to the position identifier of the selected graph grid and the information repository, generates an information instruction, and sends the instruction to the information storage module, and on the other hand, updates the control information according to an information instruction received by the information storage module; and the information storage module is configured to store the received information instruction and the information instruction to be sent.

An instant messaging system based on a graph grid includes an instant messaging server and the foregoing instant messaging client, where the instant messaging server is configured to store and forward graph grid information of the instant messaging client.

Preferably, the instant messaging server includes an information repository kept in synchronization with the instant messaging client.

By using the instant messaging method provided in the present invention, a user can completely present an intention or idea to be expressed by freely combining an icon and a sound identifier in a graph grid. Compared with conventional instant messaging manners, the present invention can enable a user to take part in a process of creating and parsing information, provide more space for imagination and putting the imagination into action to the user, so that an emotion of the user is revealed in a rich and interesting manner.

DETAILED DESCRIPTION

The following further describes technical contents of the present invention in detail with reference to the accompanying drawings and specific embodiments.

Figure 1:
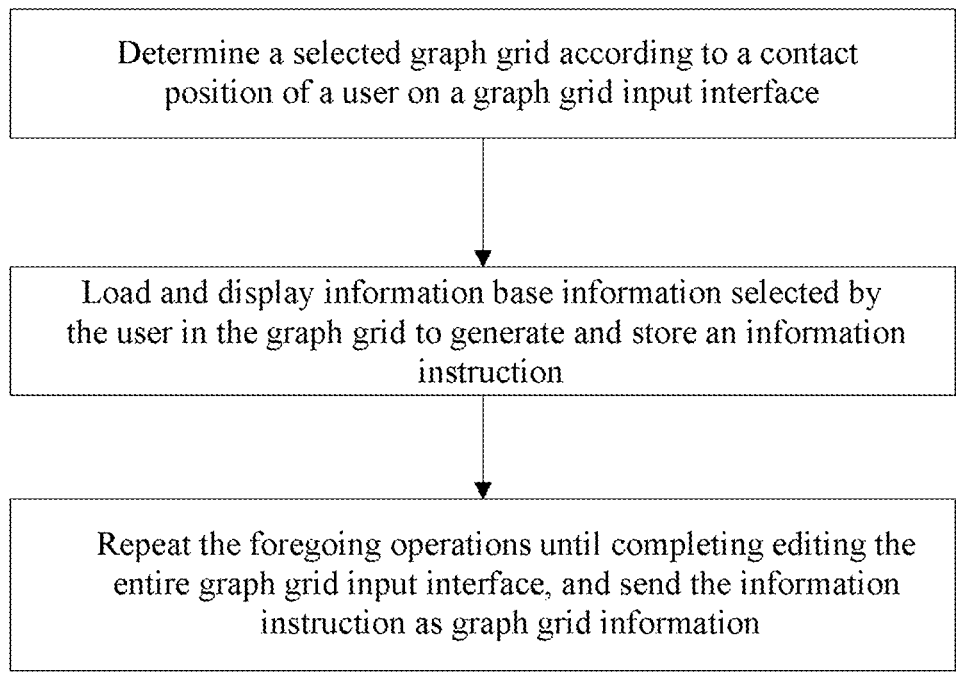
FIG. 1 is a flowchart of implementing an instant messaging method based on a graph grid according to the present invention.

Referring to FIG. 1, an instant messaging method provided in the present invention is implemented based on a graph grid. The graph grid mentioned in the present invention is an instant message presentation form. An information input interface is divided into several grids, and a user loads icons and sound identifiers into the grids by means of free combination, so as to express a specific idea of the user by means of a combination of the icons and sound identifiers in the grids. Specific implementation includes the following steps: determining a selected graph grid according to a contact position of the user on a graph grid input interface; loading and displaying repository information selected by the user in the graph grid to generate and store an information instruction; and repeating the foregoing operations until completing editing the entire graph grid input interface, and sending information instructions generated by all graph girds as one piece of graph grid information.

Figure 2:
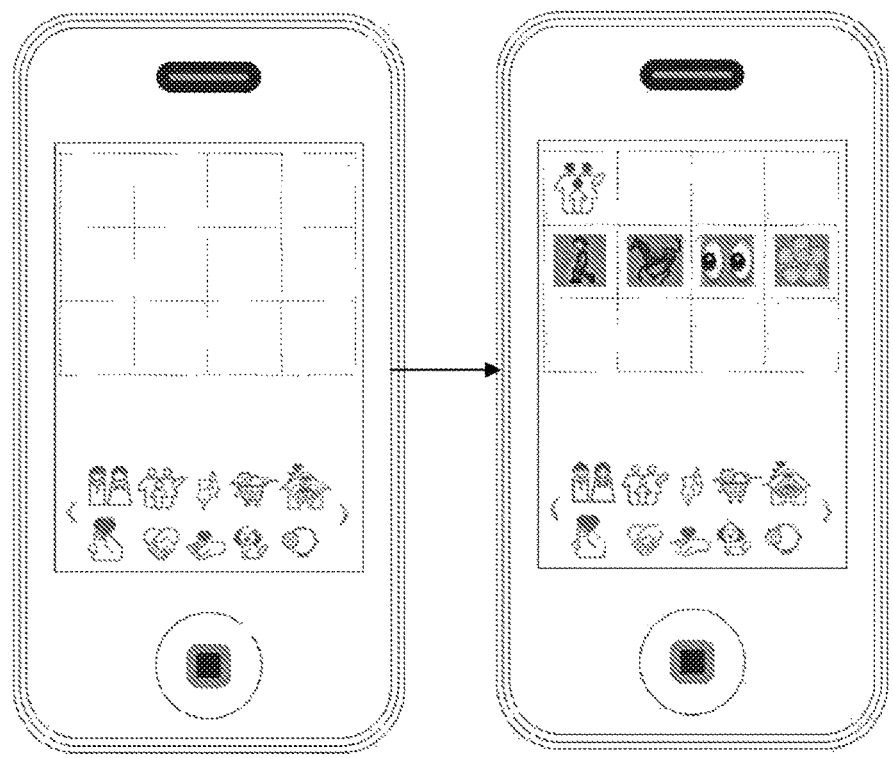
FIG. 2 is a schematic diagram of a display effect of graph grid information on a graph grid input interface according to the present invention.

Referring to FIG. 2, a user selects icons and/or sound identifiers from an information repository (repository in short), and places the icons and/or the sound identifiers on a graph grid input interface in sequence. After the icons and/or the sound identifiers in graph grids are combined in sequence, an idea of "a family gain a superficial understanding through cursory observation" expressed by the user is completely presented. Compared with loading of a single icon, for example, an expression package in QQ or WeChat, in the present invention, the user may place the icons and the sound identifiers at any positions of the graph grids by means of free combination, so as to reveal an emotion and intention of the user in a richer and more interesting manner.

Embodiment 1

Step 1: Determine a selected graph grid according to a contact position of a user on a graph grid input interface.

Figure 3:
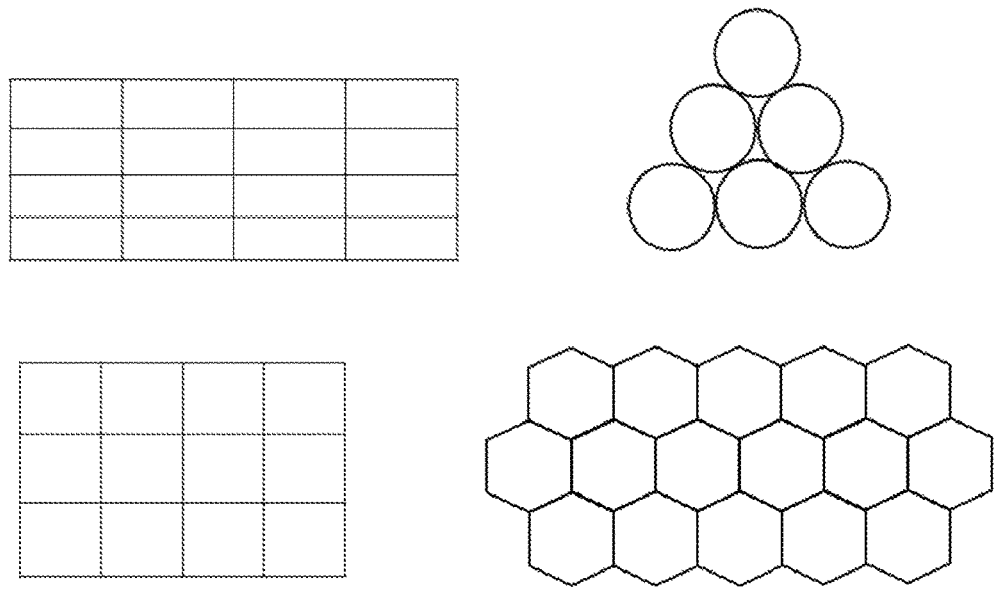
FIG. 3 is a schematic diagram of different graph grid styles used by a graph grid input interface according to the present invention.

Different from conventional instant messaging manners, according to the present invention, an information input interface is divided into several graph grids. There may be multiple graph grid styles of the graph grid input interface, for example, a rectangle, a square, a circle, and a hexagon in FIG. 3. The graph grid style is not specifically limited in the present invention. In actual application, the user not only can freely select the graph grid style according to demands, but also can select a size of the graph grid, for example, a specification of 3*3, or 4*4.

When the graph grid input interface is divided, a coordinate area of each graph grid needs to be recorded, and each graph grid is configured with a unique identifier number (ID number) capable of determining a position of the graph grid. A position of the selected graph grid is determined according to the ID number. When graph grid information is received, an icon/sound identifier can be accurately loaded into a corresponding graph grid according to the ID number. The aforementioned graph grid form may be freely selected. In the present invention, by allocating the unique ID number to the graph grid, it is ensured that a receiving party can accurately receive the graph grid information without being limited by the graph grid style.

After the user opens the graph grid input interface, a graph grid control list needs to be initialized first. The list controls display of icons and/or sound identifiers on the entire graph grid input interface, including the ID number of the graph grid and corresponding control information of the graph grid. The ID number of the graph grid is used as an index to retrieve the corresponding control information of the graph grid. Each graph grid in the present invention is a control unit. The control units are independent from each other and do not affect each other. Control information of each control unit includes: graph grid center point coordinates expressed by pixels, an icon number, graph grid lower right point coordinates expressed by pixels, and a sound identifier number. The graph grid center point coordinates are a position in which an icon is loaded, and the corresponding lower right point coordinates are a position in which a sound identifier is loaded. In the present invention, position coordinates expressed by pixels are used, to ensure that loading of icons and/or sound identifiers is not limited by screen resolution of a device.

Step 2: Load and display repository information selected by the user in the graph grid to generate and store an information instruction.

An information repository includes a system icon base and sound identifier base, and further includes a user-defined base. The icons may be planar images, dynamic images, and three-dimensional images. Pictures, icons, and sound identifiers in the information repository need to be configured with unique identifier numbers. A corresponding icon and sound identifier are retrieved and loaded according to the configured icon number and sound identifier number. The graph grid information in the present invention is based on the icon number and sound identifier number. Therefore, to ensure that same graph grid information can be received and loaded between clients, not only a client is configured with an information repository, but also a server is configured with an information repository, and the information repository of the client needs to be kept in synchronization with that of the server at any time.

After the user selects a particular graph grid on the graph grid input interface, whether the contact position is in a coordinate area of the graph grid is first determined according to contact coordinate information of the user; and if yes, an ID number of the graph grid is acquired to determine whether the contact position of the user is in an icon area or in a sound identifier area. If the contact position of the user is in the icon area, the icon base is invoked for icon selection by the user; and if the contact position of the user is in the sound identifier area, the sound identifier base is invoked for sound identifier selection by the user. Then, the control information of the control unit is acquired according to the ID number, and whether the control information includes the icon and the sound identifier is detected. Next, a graph grid editing operation to be performed is determined. The user taps and selects the icon and/or sound identifier in the information repository. The icon number and/or the sound identifier number are associated with a graph grid of a contact point, and are displayed on the graph grid input interface. Meanwhile, the ID number of the graph grid, the icon number, and the sound identifier number are stored in a graph grid information repository as one information instruction.

1) When the user selects the repository information as new information is input, the graph grid control list is initialized. An icon number and a sound identifier number that are detected in a control unit are in a space state. In this case, a selected icon number and sound identifier number only need to be stored in the control unit: an icon corresponding to <icon number m> is taken out from the icon base, and <icon number m> is stored in an <ID n> control unit simultaneously. Next, the graph grid center point coordinates are taken out from the control unit, and the icon of <icon number m> is displayed at the point. Similarly, a sound identifier corresponding to <sound identifier number s> is taken out from the sound identifier base, and is stored in the <ID n> control unit. Next, the lower right point coordinates are taken out from the control unit, a graph of the sound identifier is displayed at the point, and sound of the sound identifier sounds simultaneously. After the graph grid editing is completed, <ID n>, <icon number m>, and <sound identifier number s> are stored in the graph grid information repository as one information instruction.

2) When icon and/or sound identifier information need to be re-edited, it is detected that an icon number and/or a sound identifier number exist in a control unit and an original icon number and/or sound identifier number are replaced. For example, an icon corresponding to <icon number m> is taken out from the icon base, and <icon number m> is stored to replace the original icon number. Center point coordinates are taken out from an <ID n> control unit, and the icon is displayed at the point. Similarly, if there is a sound identifier in the <ID n> control unit, the sound identifier corresponding to <sound identifier number s> is taken out from the sound identifier base to replace the original sound identifier number. Lower right point coordinates are taken out from the <ID n> control unit, a graph of the sound identifier is displayed at the point, and sound of the sound identifier sounds simultaneously. After the graph grid editing is completed, <ID n>, <icon number m>, and <sound identifier number s> are stored in the graph grid information repository as one information instruction.

Step 3: Repeat the foregoing operations until completing editing the entire graph grid input interface, and send information instructions generated by all graph grids as the graph grid information.

In the present invention, each graph grid is used as a smallest information input unit, in which an icon and/or a sound identifier can be separately loaded. A user loads selected icons and/or sound identifiers into grids of the graph grid input interface in sequence, and stores information instructions of the graph grids in a graph grid information repository in sequence. After editing of the information instructions of the graph grids on the entire graph grid input interface is completed, the information instructions are sent to a receiving client as one piece of instant information. Certainly, graph grid information may also be taken out from the graph grid information repository and re-edited.

When processing received graph grid information, the client extracts and executes each information instruction in sequence. When the information instruction is executed, the graph grid control list is initialized first. Control information of the graph grid control unit is retrieved according to the graph grid ID number of the information instruction. An icon number and a sound identifier number included in the information instruction are stored in the control unit of the graph grid. Graph grid center point coordinates and lower right point coordinates are taken out from the control unit, and an icon and a sound identifier corresponding to the <icon number> and <sound identifier number> are respectively displayed at corresponding positions. After execution of all information instructions in the graph grid information is completed, loading of the corresponding icons and sound identifiers is completed, and sound of the sound identifiers sounds simultaneously, and one piece of complete graph grid information is presented.

Embodiment 2

In Embodiment 1, the client can accurately receive the graph grid information and load the graph grip information into each graph grid in sequence. However, due to different graph grid styles, when icons are combined and presented, a meaning expressed by the user may vary. To further ensure consistency of graph grid information between clients, in this embodiment, a graph grid style selected by a sending party is sent to a receiving client as content of the graph grid information. Regardless of a graph grid style used between the clients, a receiving party can accurately receive graph grid information the same as that of a transmit end. A specific implementation process of this embodiment is similar to that of Embodiment 1. The difference lies in that, when editing of graph grid information is completed, a graph grid style identifier selected by a user needs to be acquired, and the identifier is carried in the graph grid information. To parse the graph grid information, a receive end first initializes a style of a graph grid input interface according to the graph grid style identifier, and loads icons and sound identifiers in sequence. The graph grid style identifier is sent as the graph grid information, so as to ensure that the receive end can accurately load the graph grid information of the transmit end. Therefore, in this embodiment, graph grid style information identifiers of the entire graph grid input interface are added into the graph grid information, to further ensure accuracy of information interaction between the clients.

Embodiment 3

Figure 4:
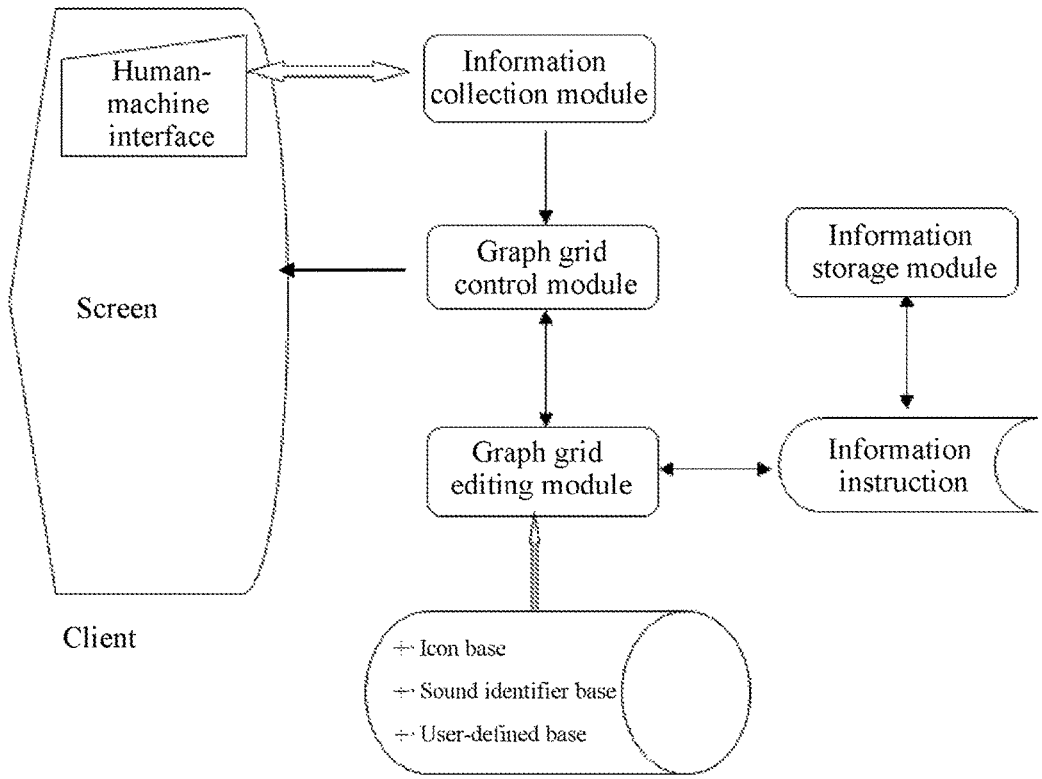
FIG. 4 is a schematic structural diagram of an instant messaging client according to the present invention.

Referring to FIG. 4, the present invention further provides an instant messaging client configured to implement the foregoing instant messaging method. The client includes an information collection module, a graph grid control module, a graph grid editing module, an information storage module, and an information repository.

The information collection module is configured to acquire contact information of a graph grid input interface, and determine a selected graph grid position identifier according to the contact information. The graph grid position identifier is an ID number configured for each graph grid.

The graph grid control module is configured to control display of an icon and a sound identifier and play of sound. The module includes a graph grid control list. ID numbers and control information of all graph grids are configured in the list. The graph grid control list is retrieved according to an ID number acquired by an information collection unit to acquire the control information of the graph grid, and display of the icon and sound identifier and play of sound in the sound identifier are controlled according to the control information.

The information repository includes an icon base and a sound identifier base. The information repository not only includes information about an icon, a picture and a sound identifier that is configured by the client, but also includes information about, for example, a self-defined icon of a local user, an icon, or a sound identifier. Identifiers of the information repository are icon numbers and sound identifier numbers configured for icons, pictures and sound.

The graph grid editing module edits and updates the control information in the graph grid control module according to the ID number of the graph grid and the icon number and/or the sound identifier number. When the graph grid information to be sent is edited, the control information of the graph grid is retrieved according to the ID number acquired by the information collection module, and the control information in the graph grid control module is simultaneously updated according to the icon number and/or the sound identifier number that are selected by the user; and information such as the ID number, the icon number and/or the sound identifier number, or the graph grid style identifier is generated into information instructions, which are stored in a graph grid information repository in sequence. When the graph grid information is received, the information instructions are taken out from the graph grid information repository in sequence, the control information of the control unit is retrieved according to the ID number of the graph grid, and the icon number and the sound identifier number in the graph grid control module are updated.

The information storage module is the graph grid information repository, and is configured to store information instructions to be sent and received. When the graph grid information is edited, the graph grid editing module completes storage of the information instructions of the graph grids on the entire graph grid input interface in sequence, and sends the information instructions as one piece of graph grid information. However, for receiving the graph grid information, the information instructions are taken out in sequence, and are delivered to the graph grid editing module for updating the control information.

Embodiment 4

Figure 5:
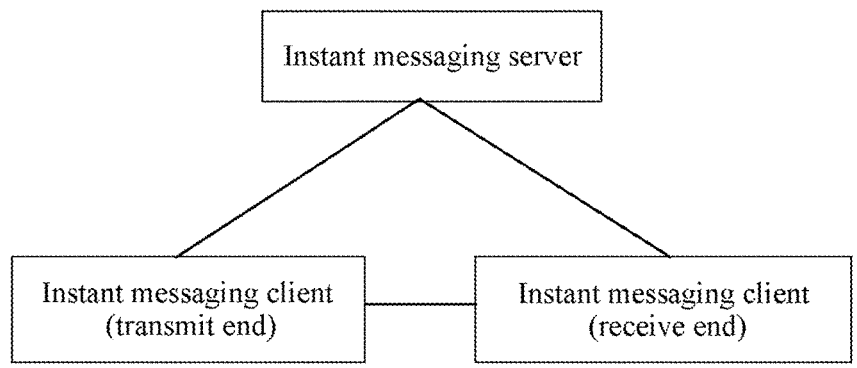
FIG. 5 is a schematic structural diagram of an instant messaging system according to the present invention.

Referring to FIG. 5, the present invention further provides an instant messaging system based on a graph grid. The system includes an instant messaging server and the foregoing instant messaging client. The instant messaging server is mainly responsible for providing storage and forwarding services of graph grid information, and sending a graph grid information as instant message to the instant messaging client after login; and the instant messaging client is configured to edit, send, receive, notify, and display a graph grid message. In actual communication, the instant messaging server is configured to receive the graph grid information sent by the instant messaging client, store content of the graph grid information and then forward the information to another receiving instant messaging client. The instant messaging server is configured with an information repository. The information repository of the instant messaging server needs to be kept in synchronization with the information repository of the instant messaging client, so as to ensure accurate loading of the icon and the sound identifier between the clients.

The foregoing describes the instant messaging method, client, and system based on a graph grid provided in the present invention in details. For a person skilled in the art, any obvious modification made to the present invention without departing from essence and spirit of the present invention will constitute a violation of a patent right of the present invention, and the person shall bear corresponding legal liabilities.

What is claimed is:

1. An instant messaging method based on a graph grid, used to implement sending of graph grid information, and comprising the following steps:
   step 1: determining a graph grid according to a contact position of a user on a graph grid input interface;
   step 2: selecting icons and/or sound identifiers from an information repository by a user, loading and displaying the icons and/or sound identifiers selected by the user in the graph grid, the icons and/or the sound identifiers in graph grids being combined in sequence to present ideas expressed by the user; a position identifier of the graph grid being associated with the corresponding icons and/or sound identifiers and storing as information instructions; and step 3: repeating the foregoing operations until completing editing the entire graph grid input interface, and sending the information instruction as the graph grid information.

2. The instant messaging method according to claim 1, wherein step 1 further comprises:
   determining whether the contact position is in a coordinate area of a particular graph grid of the graph grid input interface according to coordinates of the contact position; and if yes, acquiring the position identifier of the selected graph grid and invoking the information repository; and otherwise, neglecting the operation.

3. The instant messaging method according to claim 1, wherein step 2 further comprises:
   retrieving control information according to the position identifier of the selected graph grid;
   displaying the icons and/or sound identifiers from the information repository on the graph grid input interface according to the control information.

4. An instant messaging method based on a graph grid, used to implement receiving of graph grid information, and comprising the following steps:
   step 1: receiving graph grid information, extracting and executing each information instruction in sequence;
   step 2: determining corresponding position of the graph grid according to a position identifier in the information instruction, loading icons and/or sound identifiers into the corresponding graph grid according to information of the icons and/or sound identifiers in the information instruction, wherein the icons and/or the sound identifiers in graph grids being combined in sequence to present ideas expressed by the user;
   step 3: presenting graph grid information completely when each information instruction in the graph grid information being executed, the corresponding icons and/or the sound identifiers being displayed, and the corresponding sound identifiers being played.

5. The instant messaging method according to claim 1, wherein the information repository comprises icons, wherein each of the icons is configured with a unique icon number.

6. The instant messaging method according to claim 5, wherein the icons comprise planar images, dynamic images, and three-dimensional images.

7. The instant messaging method according to claim 5, wherein the information repository comprises sound identifiers, wherein each of the sound identifiers is configured with a unique sound identifier number.

8. The instant messaging method according to claim 3, wherein the control information comprises graph grid center point coordinates and an icon number, wherein the graph grid center point coordinates are a display position of an icon.

9. The instant messaging method according to claim 8, wherein the control information further comprises graph grid lower right point coordinates and a sound identifier number, wherein the graph grid lower right point coordinates are a display position of a sound identifier.

10. The instant messaging method according to claim 1, wherein the graph grid information comprises the position identifier of the graph grid and the information repository identifier, wherein the position identifier of the graph grid is used to determine a position of the graph grid on the graph grid input interface, and the information repository identifier is an icon number and/or a sound identifier number.

11. The instant messaging method according to claim 10, wherein the graph grid information further comprises a graph grid style identifier, wherein the graph grid style identifier is used to determine a style of the graph grid input interface used by a transmit end.

12. An instant messaging client comprising a means for information collection, a means for graph grid control, a means for graph grid editing, a means for information storage, and an information repository, wherein
   the means for information collection is configured to acquire contact information of a graph grid input interface, and determine a selected graph grid according to the contact information;
   the means for graph grid control acquires control information of the graph grid according to a position identifier of the selected graph grid, and controls display of icons and/or sound identifiers and play of sound identifiers according to the control information;
   the information repository is configured to store the icons and/or sound identifiers, wherein a user selects the icons and/or sound identifiers from the information repository, loads and displays the icons and/or sound identifiers selected by the user in the graph grid, the icons and/or the sound identifiers in graph grids are combined in sequence to present ideas expressed by the user;
   on one hand, the means for graph grid editing updates the control information according to the position identifier of the selected graph grid and the information repository, generates an information instruction, and sends the instruction to the means for information storage, and on the other hand, updates the control information according to an information instruction received by the means for information storage; and
   the means for information storage is configured to store the received information instruction and the information instruction to be sent.

13. The instant messaging method according to claim 4, wherein the information repository comprises icons, wherein each of the icons is configured with a unique icon number.

14. The instant messaging method according to claim 4, wherein the control information comprises graph grid center point coordinates and an icon number, wherein the graph grid center point coordinates are a display position of an icon.

15. The instant messaging method according to claim 4, wherein the graph grid information comprises the position identifier of the graph grid and an information repository identifier, wherein the position identifier of the graph grid is used to determine a position of the graph grid on the graph grid input interface, and the information repository identifier is an icon number and/or a sound identifier number.

* * * * *